(No Model.)
F. W. MOSURE & I. WARNER.
POST HOLE AUGER.
No. 526,454.            Patented Sept. 25, 1894.
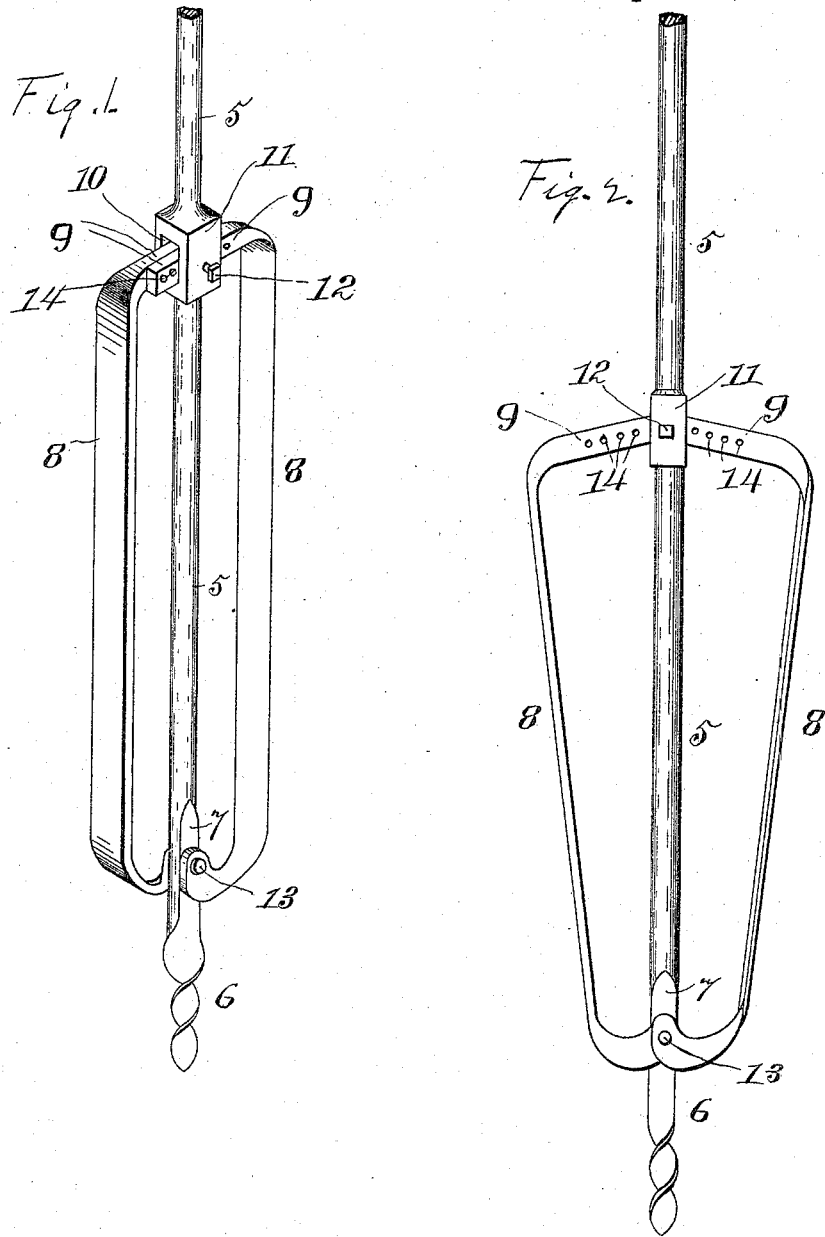

UNITED STATES PATENT OFFICE.

FRANKLIN W. MOSURE, OF VERA CRUZ, AND ISAAC WARNER, OF LINN GROVE, INDIANA.

POST-HOLE AUGER.

SPECIFICATION forming part of Letters Patent No. 526,454, dated September 25, 1894.

Application filed June 12, 1894. Serial No. 514,327. (No model.)

*To all whom it may concern:*

Be it known that we, FRANKLIN W. MOSURE, residing at Vera Cruz, in the county of Wells and State of Indiana, and ISAAC WARNER, residing at Linn Grove, in the county of Adams, in said State, both citizens of the United States, have invented certain new and useful Improvements in Post-Hole Augers; and we do hereby declare that the following is a full, clear, and exact description of the invention, which will enable others skilled in the art to which it appertains to make and use the same, reference being had to the accompanying drawings, which form part of this specification.

Our invention relates to improvements in post augers, and the objects of our improvements are, to provide an improved post auger which shall perform the work more speedily and with less power, and second which shall have removable and adjustable knives, so that the same tool can bore post holes of different sizes, and be detached for sharpening. We attain these objects by the mechanism illustrated in the accompanying drawings, in which—

Figure 1 is a perspective view of our improved post auger; and Fig. 2 is a side view showing the top of the blades extended.

Similar numerals refer to similar parts throughout both the views.

The construction is as follows: The operating or central rod 5 terminates at its lower end in a short auger 6, and just above that, the rod 5 is provided with a flattened surface 7, to which are pivotally attached two narrow knife blades 8, adjusted at suitable distances from the central rod 5. These knife blades 8 terminate at their upper ends in cross arms 9, which are adjustably secured to the rod 5. Our preferred method of securing these arms 9 is to adapt them to pass through an aperture 10, in a head piece 11 on the rod 5. This head piece 11 may be formed separately and attached to the rod 5, or it may be simply an enlargement of the rod itself at that particular place, provided with an aperture for the arms 9. A set screw 12 passes into this head piece 11 so as to fasten securely therein the cross arms 9 of the upper ends of the blades 8. The knives 8 are formed in cross section so as to cut smoothly and evenly when revolved by the rod 5. They can be removed from the rod by loosening the set screw 12 and the pivot 13 for sharpening whenever desired. The cutting area of the tool is never smaller than the lower diameter of the arc of revolution of the knives, but the arc of the upper end of the knives is enlarged to a greater diameter by loosening the set screw 12, and moving the blades 8 by tightening the set screw. This set screw may hold the arms 9 within the aperture 10 simply by impinging against them and clamping them in place, or the arms 9 may be provided with small holes 14, so that the set screw passes through such holes 14, and thus holds them securely. It is immaterial which method is adopted, so that the arms 9 are held securely in the head piece 11 when in operation.

It is obvious that where it is desired to use our auger for boring holes of a given diameter, it can be so used without the adjustable constructions described.

The auger bit 6, when in operation, locates the exact center of the hole to be bored, and by means of its extension beyond the lower ends of the knives 8, it penetrates the ground some distance before the knives 8 commence to cut the earth, and therefore in connection with a handle, not shown, which is attached to the upper end of the rod 5, for operation, the rod is held firmly in a fixed vertical position, and the knives cut the earth upon an axis represented by its center.

The mode of operation is readily understood from the above description.

The knives 8 are of sufficient width to make them firm and strong, and in connection with the rod, they will lift out any earth or dirt that may be moved in cutting the hole and operating in the manner described, the hole is bored rapidly and with little power comparatively.

Having thus described our invention, what we claim as new, and desire to secure by Letters Patent, is—

1. A post hole auger consisting of a central rod terminating at its lower end in a short auger: knife blades arranged parallel or nearly so to said rod, their lower ends extended in a curved line and secured to said rod at a point just above the short auger so that their cutting edges commence at their points of juncture with the rod: and horizontal arms rigidly attached to the upper ends of the knife blades, extended to said rod and secured thereto.

2. A post hole auger consisting of a central rod terminating at its lower end in a short auger: knife blades arranged parallel or nearly so to said rod, their lower ends extended in a curved line and pivoted to said rod at a point just above the short auger so that their cutting edges commence at their points of juncture with the rod: horizontal arms rigidly attached to the upper ends of the knife blades, and extended to and beyond said rod and adjustably secured thereto.

In testimony whereof we hereunto subscribe our names, in the presence of two witnesses, this 29th day of May, 1894.

FRANKLIN W. MOSURE.
ISAAC WARNER.

Witnesses:
WM. WARNER,
JOHN MOSURE.